Figure 1:
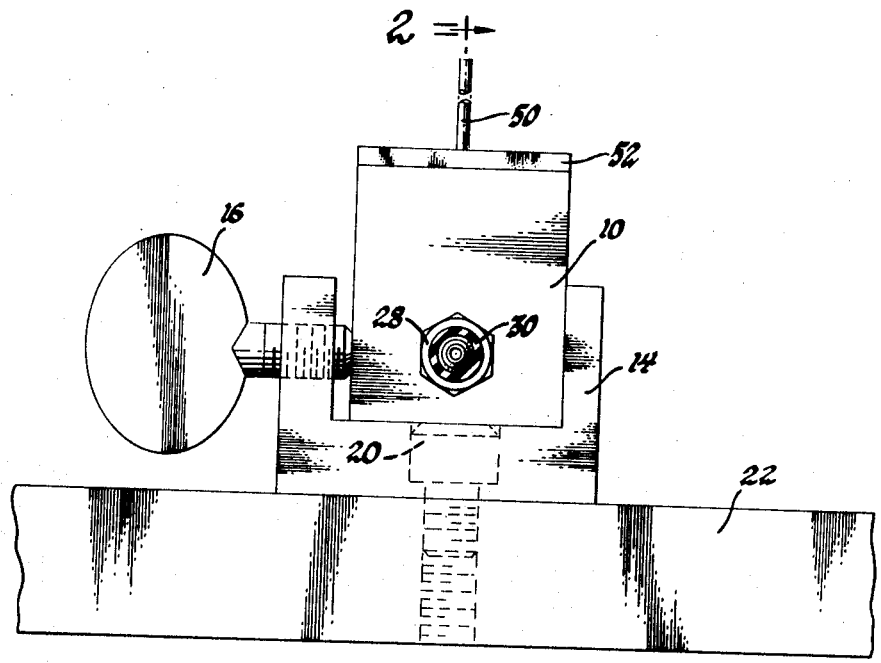

United States Patent

Dega

[15] 3,662,704
[45] May 16, 1972

[54] FLUIDIC DETECTION DEVICE
[72] Inventor: Fred W. Dega, Oak Park, Mich.
[73] Assignee: General Motors Corporation, Detroit, Mich.
[22] Filed: July 20, 1970
[21] Appl. No.: 56,593

[52] U.S. Cl. ............................... 116/70, 209/90, 235/201 FS, 251/65
[51] Int. Cl. ....................................................... G01l 19/12
[58] Field of Search ........................ 116/70, 117; 209/90, 73; 226/23; 137/81.5; 235/201 FS; 251/65, 338

[56] References Cited

UNITED STATES PATENTS 2,914,957  12/1959  Johnson ................................ 226/23 X
3,241,668  3/1966  Schonfeld et al. ............. 235/201 FS X
3,537,579  11/1970  Roberson ............................. 209/90 X Primary Examiner—Louis J. Capozi
Attorney—W. E. Finken, A. M. Heiter and D. F. Scherer

[57] ABSTRACT

A fluidic detection device for detecting the presence of an article or component. The detection device has a housing having a fluid passage therein and a detector portion having a magnet attracted to the housing adjacent to and closing the fluid passage and a catwhisker type detector element secured to the magnet and adapted to contact the article or component. Contact between the catwhisker and the article causes the magnet to open the fluid passage which controls a fluid signal to indicate the presence of the article.

3 Claims, 2 Drawing Figures

PATENTED MAY 16 1972

3,662,704

INVENTOR.
Fred W. Dega
BY
Donald F. Scherer
ATTORNEY

FLUIDIC DETECTION DEVICE

The present invention is related to detector devices and more particularly to fluidic type detectors.

Fluidic detectors in the prior art have used a spring loaded poppet or ball type valve to control the flow of fluid to and from fluidic amplifiers. The spring used with these type of detectors requires a force which increases with increasing valve movement applied to the detecting member to actuate the valve. The present invention utilizes a magnetic component to control fluid flow so that as the detector is actuated the force required to control the fluid flow decreases as the detector is actuated.

The present invention includes a housing member which may be secured with a machine tool, a conveyor or similar structures in which it is desirable to detect moving components. A fluid passage is formed in the housing and is adapted to control a fluidic amplifier which in turn actuates the control for the machine. Fluid flow in the passage is controlled by a magnet which is attracted to the housing adjacent the passage to effectively close the passage and a detector member secured to the magnet and extending outside the housing in a position where the article or component to be detected will travel. Contact between the detector member and the article will cause the magnet to detach from the housing thereby opening the fluid passage to cause the machine control to function. When the article to be detected moves out of contact with the detecting member the attraction between the magnet and the housing will cause the magnet to reseat on the housing thereby closing the fluid passage. As the magnet is moved by the detector, the attraction force between the magnet and the housing will decrease thereby diminishing the force required to hold the passage open. This permits the detector to be used with small light-weight components.

It is an object of this invention to provide an improved fluidic detector having a housing with a fluid passage therein, a magnet attracted to the housing in closing relationship with the passage and a detector secured to the magnet and extending outside the housing adapted to contact an article to be detected thereby moving the magnet to permit opening of the fluid passage.

Figure 2:
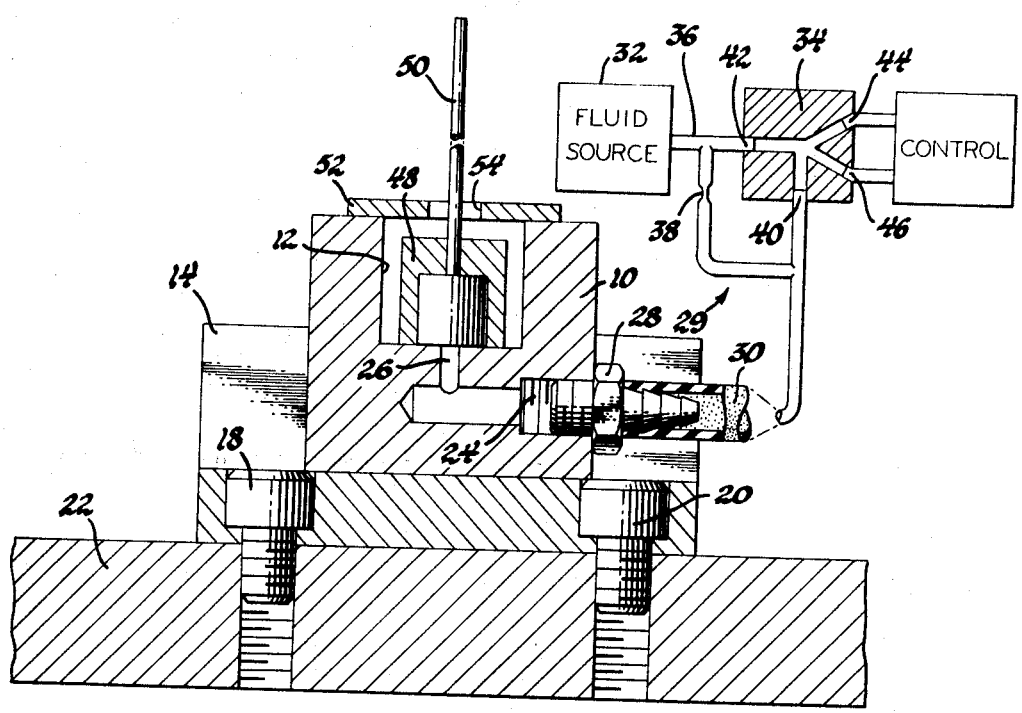

This and other objects and advantages of the present invention will be more apparent from the following description and drawing in which:

FIG. 1 is an elevational view of the detector; and
FIG. 2 is a cross sectional view of the detector taken along line 2—2 of FIG. 1.

Referring to the drawing wherein like characters represent like or corresponding parts, there is shown a housing 10 having a cylindrical recess 12 which housing 10 is secured to a mounting block 14 by a thumb screw 16. The mounting block 14 is secured by fasteners 18 and 20 to a stationary member 22. A fluid passage 24 is formed in the housing 10 and is in fluid communication via a passage 26 with the cylindrical recess 12. A fitting 28 is threaded into the passage 24 and is in fluid communication with a fluid system, generally designated 29, through a conduit 30.

The fluid system 29 includes a fluid source 32 in fluid communication with a mono-stable fluid amplifier 34 via a passage 36. The passage 36 is in fluid communication through a restriction 38 with the passage 30 which is also in communication with a control port 40 of the fluid amplifier 34. The control port 40 directs fluid communicated to an inlet port 42 to an outlet port 44 when the conduit 30 is pressurized and to an outlet port 46 when the conduit 30 is not pressurized. The outlet ports 44 and 46 are adapted to be connected to conventional fluidic control devices such as counters, inter-face mechanisms or the like to provide the desired control.

A magnet 48 is located in the cylindrical recess 12 and is attracted to the end wall of the recess 12 adjacent the passage 26. A non-magnetic catwhisker type detector 50 is secured to the magnet 48. A cover 52 having an opening 54 surrounds a portion of the detector 50 and closes the cylindrical recess 12. The cover 52 is secured to the housing 12 by any conventional method such as bonding or threaded fasteners.

The housing 10 is located on the stationary member 22 in a position that will permit the detector 50 to engage the article or component to be detected. For example, if the detector is to be used as a limit switch on a machine tool such as a drill press, the housing 10 is positioned on the frame of the drill press in a position such that the detector 50 will contact the drill head when it has traveled a desired amount. The housing 10 may also be mounted on a device for conveying articles in a position such that the detector 50 will contact articles traveling on the conveying device thereby permitting the articles to be detected to permit counting thereof or any other desired function.

As the detector 50 is contacted, it will be moved thereby causing the magnet 48 to tip on one edge so that the passage 26 will be open to the cylindrical recess 12 and through the opening 54 to atmosphere. When the magnet 48 is in the position shown the conduit 30 will be pressurized so that output port 44 of the fluid amplifier will be pressurized to provide one control signal. When the detector 50 is detected and the magnet 48 opens the passage 26, the conduit 30 will be exhausted so that the output port 46 of the fluid amplifier 34 will be pressurized so that another control signal is present. As the magnet 48 is moved, the attraction force between the magnet 48 and the end wall of recess 12 will diminish. Therefore, the force required to maintain the passage 26 open will be less than the force required for initial movement of the magnet 48.

Obviously, many modifications and variations of the present invention are possible in light of the above teachings. It is, therefore, to be understood that within the scope of the appended claims the invention may be practiced otherwise than is specifically described.

What is claimed is:

1. A fluidic detection device for detecting a moving article comprising, a housing including a chamber having an end wall and cover means for said chamber opposite said end wall, fluid passage means in said housing communicating with said chamber through the end wall; and magnetic means having a magnet portion in said chamber adjacent said fluid passage means and being attracted to the end wall of said chamber to close said passage means from said chamber, and detection means secured to said magnet portion and extending through said cover means for contacting the article and responding to contact of the article to move said magnet portion to open said passage means to said chamber; said magnet portion returning to close said passage when the article moves out of contact with said detector means.

2. A fluidic detection device for detecting a moving article comprising a fluid source housing means including a chamber having an end wall and cover means for said chamber opposite said end wall, fluid passage means in said housing communicating with said chamber through the end wall and being in fluid communication with said fluid source; magnetic means having a magnet portion in said chamber adjacent said fluid passage means and being attracted to the end wall of said chamber to close said passage means from said chamber, and detection means secured to said magnet portion and extending through said cover means for contacting the article and responding to contact of the article to move said magnet portion to open said passage means to said chamber; said magnet portion returning to close said passage when the article moves out of contact with said detector means; and fluidic amplifier means in fluid communication with said source and said fluid passage means for emitting one signal when said magnet portion is closing said passage means and another signal when said passage means is open.

3. A fluid detection device for detecting a moving article comprising, a fluid source; a housing including a chamber having an end wall and cover means for said chamber opposite said end wall, fluid passage means in said housing communicating with said chamber through the end wall and being in fluid communication with said fluid source; and magnetic means, for providing a high attraction force to close said passage means and a diminishing attraction force when said passage means is opening, including a closing portion in said chamber adjacent said fluid passage means and being attracted to the end wall of said chamber to close said passage means from said chamber, and detection means secured to said closing portion and extending through said cover means for contacting the article and responding to contact of the article to move said closing portion to open said passage means to said chamber; said closing portion returning to close said passage when the article moves out of contact with said detector means.

* * * * *